June 3, 1958  E. T. ARMSTRONG  2,837,180
HEAT ABSORBING BRAKE MEANS
Filed June 24, 1954

*INVENTOR.*
EDWARD T. ARMSTRONG
BY
*R. L. Miller*
Attorney

United States Patent Office 2,837,180
Patented June 3, 1958

2,837,180

HEAT ABSORBING BRAKE MEANS

Edward T. Armstrong, Passaic, N. J., assignor to The Goodyear Tire & Rubber Company, Akron, Ohio, a corporation of Ohio Application June 24, 1954, Serial No. 439,066

5 Claims. (Cl. 188—218)

This invention relates to heat absorbing means and is especially useful in the construction of bodies of solid material to be used in positions where they are subjected at least intermittently to very high temperatures. The invention is especially useful in construction of brake elements subjected to friction and in engine valves, heat engine parts and the like, but may be used wherever a part is required to absorb a great amount of heat.

In the manufacture of brakes, metal discs or other bodies are employed to frictionally contact discs or shoes of molded asbestos or other composition under pressure to absorb energy. Bodies of metal employed for this purpose have low specific heats and consequently become rapidly heated because their ability to absorb heat is relatively low.

It is an object of this invention to provide increased heat absorbing capacity of such bodies and the various other articles above mentioned without increasing the maximum temperature allowable in such bodies.

Another object is to provide such increased heat absorbing qualities without increasing the dimensions of such bodies.

Another object is to provide liquid containing cells within the bodies filled with heat absorbing liquid under hypercritical pressure.

A further object is to provide communication between the cells for filling them and to provide further heat absorption by circulation of the liquid.

These and other objects will appear from the following description and the accompanying drawings.

Figure 1:
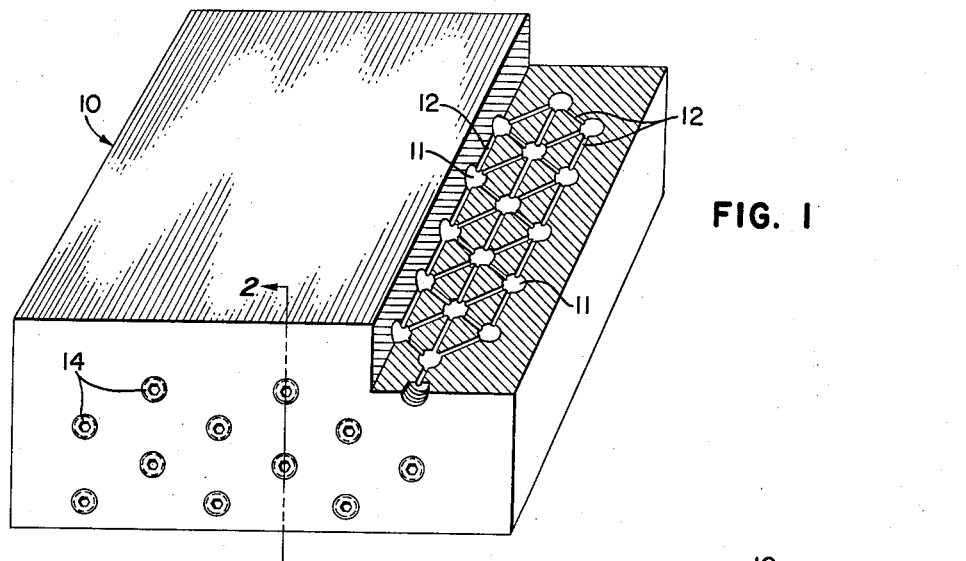
Fig. 1 is a perspective view of a heat absorbing body of rectangular form, part of the body being broken away and part shown in section to show its construction.
Figure 2:
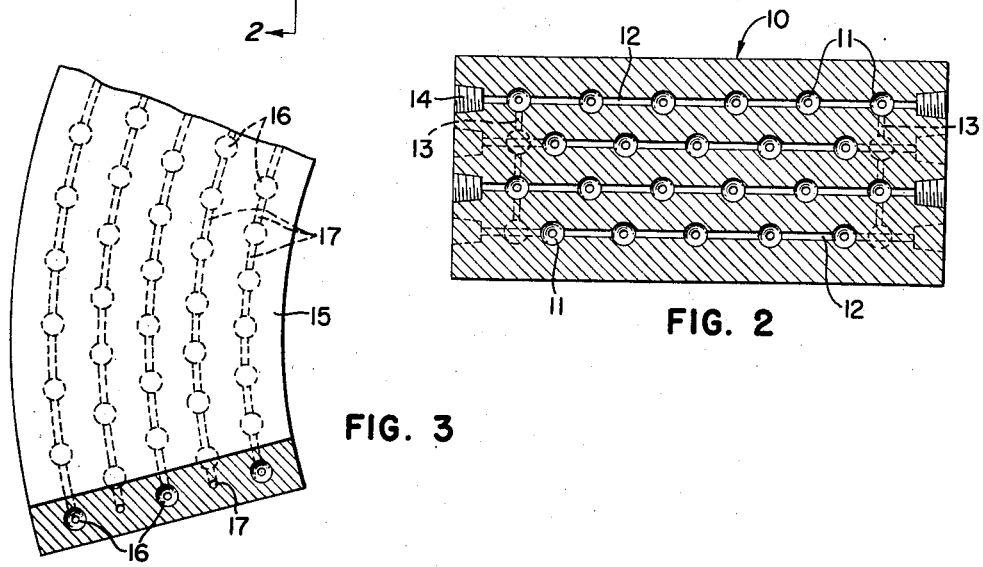
Fig. 2 is a cross sectional view of the body of Fig. 1 taken on line 2—2 of Fig. 1.

Referring to the drawings, and first to Figs. 1 and 2 thereof, the numeral 10 designates a body of metal having a multiplicity of internal cells 11, for example, arranged on hexagonal axes and in layers, and preferably so that the cells are uniformly distributed throughout the interior of the body equidistant from each other in a manner to provide the greatest volume of cells compatible with sufficient area of metal therebetween and thereabout to resist pressures developed therein. The cells of at least each layer thereof are in communication with each other and for this purpose are connected by passages 12 to permit circulation between cells of a layer thereof. Other passages 13 may be provided to connect cells of one layer to cells of adjacent layers.

To provide such a body, flat plates of metal may have half cells and connecting grooves provided in one or more faces thereof by machining or embossing and the plates may then be assembled and welded, brazed or otherwise fastened together in sealed relation. Also such bodies may be formed by casting, in which case the cells and connecting grooves may be formed by cores located in the mold.

Figure 3:
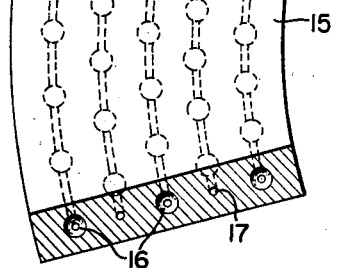
Fig. 3 is a fragmentary perspective view of a brake disc embodying the invention, part being broken away and part shown in section.

The cells and their connecting passages are filled with a liquid having greater heat absorbing properties than the surrounding metal body and for the purpose of filling the cells and the passages some of the passages are open to the faces of the body and may be sealed by closures after filling as for example by threaded plugs 14 screwed into such openings.

Where the heat absorbing body is a relatively thin annular disc as in the brake disc 15 shown in Fig. 3, the cells 16 may be provided with their centers in a single plane and spaced along concentrically arranged connecting passages 17 with the cells along one passage staggered with respect to cells of passages radially inward and outward thereof or the passages may be arranged as successive convolutions and all convolutions connected to one another. This construction has the advantage that circulation of the liquid is induced by variations in speed of the disc and this assists in absorption of heat. Plugged filling openings may be provided at various places in relation to the convolutions for facilitating the filling of the cells and passages with liquid, and the plurality of plugged openings insure bleeding of air from the cells and passages during filling with the liquid and prior to plugging the openings. While a single layer of cells has been shown, in thicker annular bodies two or more layers of cells may be provided.

As liquids have much higher specific heats or heat storing capacity than solids, it is proposed to fill the cells and passages with a liquid such as water or liquefied ammonia having such properties. Furthermore, as it has been found that such liquids have even higher heat absorbing properties when hypercritically pressurized, it is proposed to charge the cells under critical pressure and to seal the cells at such pressure.

Since the specific heat of water is about six times that of metals it will be seen that water may be used for this purpose. However, it is further contemplated to employ liquids which would absorb heat due to disassociation at the temperatures encountered and to thereby provide further thermal capacity. Ammonia is a liquid fulfilling these requisites.

The advantages of the invention will be apparent from the following discussion:

In simplified analysis of the heat absorbing capacity of brakes it is assumed that the capacity to absorb energy is not greater than $$Q = W_1 C p_1 (T_1 - T_a) + W_2 C p_2 (T_2 - T_a)$$

Where

Q is the total capacity of the brake in B. t. u.

$W_1$ is the weight of the brake disc plus the equivalent weight of the brake lining.

$Cp_1$ is the specific heat of the brake disc assumed constant and typically low as of a metal.

$T_1$ is the maximum permissible temperature of the disc, assumed uniform throughout the disc volume.

$T_a$ is the ambient temperature, and subscript 2 quantities, such as $W_2$, $Cp_2$ and $T_2$ are similar but pertain to a coolant if one is present, however, not to an evaporating or disassociating coolant.

In the usual case, the simplified estimates are adequate. In the case of applicant's construction herein described, however, it will be shown that the simplified action is unacceptable.

The elementary theory from which the above equation developed cites:

$$dQ = W\, C_p\, dT$$

and the usual integration is performed assuming that $C_p$ is constant. In fact, $C_p$ varies with T. The usual variation is slight and little error arises in assuming $C_p$ is constant.

Figure 4:
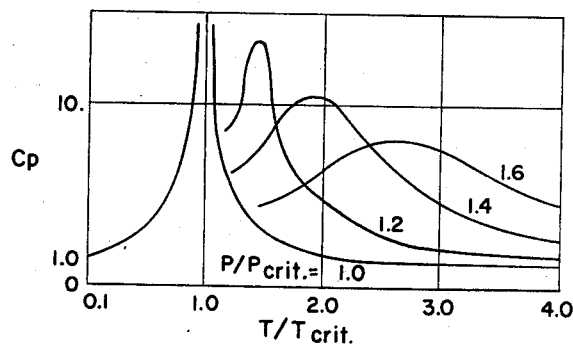
Fig. 4 is a graph showing variation of specific heat of a liquid at critical temperatures and pressures.

It is proposed in accordance with applicant's invention to use a coolant pressurized above the critical pressure at a pressure to be precisely fixed. The basis of this suggestion is the unusually large magnitude and variation of the magnitude of the specific heat of liquids in this region. The precise pressure to be used depends upon the ratio of the operating temperature of the brake disc to the critical temperature of the coolant. The typical variation of specific heat in the region of the critical pressure and above and of the critical temperature and above, is shown in Fig. 4 of the drawings where specific heat $C_p$ is plotted on the vertical axis and the ratio of the operating temperature T to the critical temperature $T_{crit}$ is plotted on the horizontal axis.

The four curves plotted represent conditions where the ratio of normal pressure P of the liquid to the critical pressure $P_{crit}$ is 1.0; 1.2; 1.4; and 1.6 respectively.

Considering these curves it is clear that in this region, the relation of $C_p$ to T is far from constant. It is equally clear that selection of the particular pressure ratio will permit limited control of the temperature-time relation and of the torque-time relation. At the same time, an increment of heat absorbing capacity may be gained.

In the construction of disc type brakes, it will be apparent that the discs may be made thinner and lighter in weight due to their greater capacity for absorbing heat and the saving in weight due to the cellular construction of the disc. Similar savings will also be made in the construction of other types of brakes.

When water is employed as the coolant, a typical charging pressure used is 3200 lbs. per square inch. Typical charging pressure using ammonia in the heat absorbing disc or other brake element are lower, being in the range of 1650 lbs. per square inch. The heat absorbing advantages gained are up to 25% or more, plus attending advantages of possible reduction in brake size or weight, and the disc remaining cooler, i. e., absorbing more heat faster and at lower temperatures. Another advantage of the invention is that the heating of the disc is more uniform, and with the liquid and the flow of liquid in the disc during braking helping to uniformly distribute the heat in the disc or other braking element.

Under severe braking conditions, for example, in a rejected take-off, or over a period of time the ammonia may disassociate and it will be necessary to replace it with undisassociated ammonia.

It is noteworthy that discs or other like braking elements can only be made so thick and that then no further advantage is gained in making them thicker because the additional thickness of metal will not further reduce the temperature of the disc at the braking surface during the relatively short braking operation. The improved disc or other brake element of the invention is not nearly so subject to this limitation as the solid metal disc.

It should be understood that the invention contemplates using charging pressures less than the critical pressure of the liquids employed, but such charging pressures that expansion of the liquids caused by a braking action and the resulting heat will induce a pressure rise to critical pressure conditions.

While application of the advantages of the invention have been directed to explanation of its application to brakes, it will be understood that the invention may also be employed in the construction of engine valves, heat engine parts or in other situations where metal bodies are subjected to high operating temperatures and rapid absorption of heat and high capacity to store heat are of importance. It has not been attempted to illustrate all such parts but their mechanical construction would depend upon their shapes.

While a certain representative embodiment and details have been shown for the purpose of illustrating the invention, it will be apparent to those skilled in this art that various changes and modifications may be made therein without departing from the spirit or scope of the invention.

What is claimed is:

1. Heat absorbing brake means comprising an impervious closed body of impervious metal defining a multiplicity of cells therewithin, each cell containing water filling said cell under a pressure of about 3200 p. s. i. and with the water being under greater than critical pressure within the range of temperatures of the brake means in use.

2. Heat absorbing brake means comprising an impervious closed body of impervious metal defining a multiplicity of cells and passages connecting said cells to one another, and ammonia confined in said cells and passages under pressure of about 1650 p. s. i.

3. A heat absorbing brake member comprising a rotatable sealed body of metal defining a closed passage therewithin extending about its axis of rotation, and a liquid confined in said passage under a pressure approaching the liquid's critical pressure when the brake is not operating and having a specific heat greater than that of said body.

4. A heat absorbing brake member comprising a rotatable sealed body of metal defining a closed passage therewithin extending about its axis of rotation, a plurality of cells providing spaced enlargements of said passage, and water confined in said cells and said passage under a pressure of about 3200 p. s. i. when said brake member is idle.

5. A heat absorbing brake member comprising a rotatable closed disc body of metal defining a plurality of closed passages extending about its axis of rotation in spaced apart convolutions, a multiplicity of cells providing spaced enlargements of said passages, and a liquid confined in said cells and said passages under a pressure at least near the critical pressure of said liquid when said brake member is idle and having a specific heat greater than that of said body.

References Cited in the file of this patent

UNITED STATES PATENTS

| | | |
|---|---|---|
| 1,905,653 | Schranz | Apr. 25, 1933 |
| 2,111,335 | Sanford | Mar. 15, 1938 |
| 2,161,293 | Heath | June 6, 1939 |
| 2,237,054 | Jensen | Apr. 1, 1941 |
| 2,254,074 | Klaue | Aug. 26, 1941 |

FOREIGN PATENTS

| | | |
|---|---|---|
| 233,941 | Great Britain | May 21, 1925 |
| 608,631 | France | Apr. 24, 1926 |
| 1,025,691 | France | Jan. 28, 1953 |